United States Patent [19]

Banks et al.

[11] Patent Number: 5,539,592
[45] Date of Patent: Jul. 23, 1996

[54] SYSTEM AND METHOD FOR MONITORING FRICTION BETWEEN HEAD AND DISK TO PREDICT HEAD DISK INTERACTION FAILURE IN DIRECT ACCESS STORAGE DEVICES

[75] Inventors: Willard K. Banks, Scotts Valley; Kok-Kia Chew, Fremont; Donald R. Gillis, San Jose, all of Calif.; Gordon J. Smith, Rochester, Minn.

[73] Assignee: International Business Machines Corporation, Armonk, N.Y.

[21] Appl. No.: 319,383

[22] Filed: Oct. 5, 1994

[51] Int. Cl.⁶ .............................. G11B 15/46; G11B 5/60; G01R 33/12; G01B 5/28
[52] U.S. Cl. ......................... 360/75; 360/103; 324/212; 324/454; 73/9; 73/105
[58] Field of Search .............................. 360/75, 103, 104, 360/137; 324/210, 212, 226, 454; 73/9, 104, 105; 340/679

[56] References Cited

U.S. PATENT DOCUMENTS

| | | | |
|---|---|---|---|
| 4,479,090 | 10/1984 | Frater et al. | 324/454 |
| 4,529,659 | 7/1985 | Hoshino et al. | 360/136 |
| 4,532,802 | 8/1985 | Yeack-Scranton | 360/25 |
| 4,692,832 | 9/1987 | Bandapa et al. | 360/137 |
| 4,841,389 | 6/1989 | Hoyt et al. | 360/75 |
| 4,970,610 | 11/1990 | Knappe | 360/75 |
| 5,014,547 | 5/1991 | Holroyd | 73/105 |
| 5,069,002 | 12/1991 | Sandhu et al. | 51/165 R |
| 5,115,664 | 5/1992 | Hegde et al. | 73/9 |
| 5,130,867 | 7/1992 | Ohashi | 360/75 |
| 5,168,412 | 12/1992 | Doan et al. | 360/103 |
| 5,168,413 | 12/1992 | Coker et al. | 360/137 |
| 5,319,509 | 6/1994 | Michelson et al. | 360/77.03 |
| 5,410,439 | 4/1995 | Egbert et al. | 360/75 |

FOREIGN PATENT DOCUMENTS 3105763  5/1991  Japan .

OTHER PUBLICATIONS

IBMB Report Tm 07.1919, Insitu Stiction Test For Failure Prediction, Wadkins, P. J. & Bates, R. M. Aug. 1992.

Primary Examiner—Stuart S. Levy
Assistant Examiner—Jefferson Evans
Attorney, Agent, or Firm—Benman Collins & Sawyer

[57] ABSTRACT

A system for predicting the failure of a storage unit, such as a disk drive. In a most general sense, the inventive system includes a first mechanism (20, 22, 24) for moving an element (16) over a surface (12) which is moving relative to the element (16). The first mechanism includes an arm (18, 20) for supporting the element (16) over the surface (12) and a motor (24) connected to the arm (18, 20). A position error detector (42) is included for detecting a change in torque applied to the motor (24) due to friction between the element (16) and the surface (12). The position error detector (42) provides a signal in response to changes in torque which is processed to predict a head disk interaction or failure of the storage system. In a particular embodiment, the position error detector (42) senses a change in a lateral force applied to the element (12) in response to a change in friction between the surface and the element. In a typical application, the storage unit is a disk drive, the surface is a disk on which a storage medium is disposed and the element is a magnetic head. In an alternative embodiment, changes in friction between the head and the medium are sensed by sensing changes in the motor current required to maintain disk speed.

16 Claims, 9 Drawing Sheets

SYSTEM AND METHOD FOR MONITORING FRICTION BETWEEN HEAD AND DISK TO PREDICT HEAD DISK INTERACTION FAILURE IN DIRECT ACCESS STORAGE DEVICES

BACKGROUND OF THE INVENTION

1. Field of the Invention

The present invention relates to direct access storage devices such as disk drive units which have a transducer head positioned over a magnetic medium. More specifically, the present invention relates to systems and techniques for predicting failure in direct access storage devices.

2. Description of the Related Art

Direct access storage devices such as disk drive provide memory storage for computers and other data processing and communication systems. The disk drives units typically include a rigid disk on which a magnetic medium is provided. A protective overcoat is applied to the magnetic medium which is typically carbon or zirconia with a thin coating of liquid or solid lubricant such as polyperfluoroether.

Data is written to and read from the medium by a transducer which flies over the disk on a cushion of air referred to as an "air bearing". The air bearing is created by a high speed rotation of the disk. Thus, notwithstanding the lubricant applied to the disk, air is the primary lubricant while the transducer is flying. A slider supports one or more transducer heads on an arm suspended from a pivot point over the disk. At the high rotation rates of conventional drives, failure of the slider to maintain head-disk separation can result in a catastrophic head disk interaction (HDI) or "head crash". While an HDI was once thought of as an instantaneous event, currently, it is recognized as a sequence of events. For example, the system may start off with the slider flying or in limited contact. If the slider then picks up some debris, the debris will either drag over the disk or alter the air bearing such that the slider flies lower. Debris may continue to collect on the slider as it flies at lower and lower spacings. Eventually, the slider begins to contact the disk initially using up the liquid or solid lubricant, wearing through the carbon overcoat and damaging the magnetic medium. This will roughen the disk surface making even partial flying over the affected tracks improbable. This is the HDI condition by which data can not be read or the servo-system fails.

Failure of a head disk assembly (HDA) from a head disk interaction frequently involves a loss of data. In some cases, the data can not be recovered. Thus, there has been a need in the art for systems and methods for predicting impending head crashes in disk drives.

One conventional technique for detecting an impending failure of a disk drive involves the use of external instruments to measure wear on the disk. This is an expensive process which necessitates an interruption of the operation of the system.

Another technique involves the use of a piezoelectric sensor mounted on the disk drive head to sense a change in friction between drive head and the medium and to generate a warning when the change in friction exceeds a predetermined level. However, this requires a costly addition of a separate piezo-electric sensor into the drive. In addition, the additional sensor may interfere with the operation of the system and increase system complexity.

Thus, a need remains in the art for an inexpensive system and technique for predicting impending head crashes which does not require an interruption in the operation of the system, external hardware or the costly addition of internal components.

SUMMARY OF THE INVENTION

The need in the art is addressed by the present invention which provides a system for predicting failure of a storage unit such as a disk drive. In a most general sense, the inventive system includes a first mechanism for moving an element over a surface which is moving relative to the element. The mechanism includes an arm for supporting the element over the surface and a motor connected to the arm. A second mechanism is included for detecting a change in friction between the element and the surface. In one embodiment, friction changes are detected by detecting a change in torque applied to the motor due to friction between the element and the surface. In this embodiment, the second mechanism provides a signal in response to changes in torque which is processed to predict a head disk interaction or failure of the storage system. Changes in torque are sensed by sensing changes in a lateral windage force applied to the element. In an alternative embodiment, frictional changes are detected by sensing a change in spindle speed.

DESCRIPTION OF THE INVENTION

Illustrative embodiments and exemplary applications will now be described with reference to the accompanying drawings to disclose the advantageous teachings of the present invention.

Figure 1:
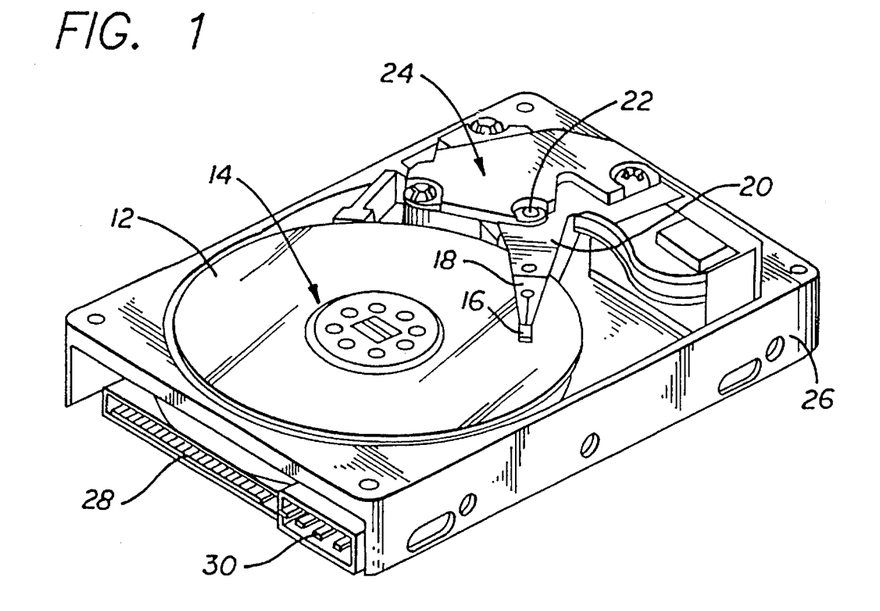
FIG. 1 is a perspective view of an illustrative head disk assembly incorporating the teachings of the present invention.

FIG. 1 is a perspective view of an illustrative head disk assembly (HDA) incorporating the teachings of the present invention. The assembly 10 includes a disk 12 on which a magnetic medium is disposed. The disk 12 is rotated at high speeds by a spindle motor 14. A magnetic transducer or head 16 is suspended over the disk at the end of a suspension 18. The head includes a transducer mounted on a slider. The head 16 and suspension 18 are suspended at the proximal end of an arm 20. The distal end of the arm 20 provides an armature within a voice coil actuator motor 24. The actuator motor 24 induces moments in the arm 20 about a pivot point 22 and thereby moves the head 16 radially over the disk 12. The assembly is mounted within a frame 26. The motors 14, 24 and the head 16 are activated by a host system (not shown) through an electronic circuit (not shown) disposed on a circuit board 28. Electrical interconnect between the board and the host system is effected via receptacles 28 and 30.

In many cases, multiple head disk assemblies are stacked within a single unit. As is common in the art, the magnetic medium on the disk 12 is organized into cylinders, data tracks within the cylinders and sectors within the data tracks. Data is written to and from the radially spaced tracks by the transducer head 16. The position of the head relative to a particular track on the disk is maintained by a servo-control unit in a conventional manner. The suspension 18 is lightly biased so that the head 16 flies on an air bearing over the disk 12 when the disk 12 is rotated at a high speed by the spindle motor 14.

As mentioned above, at the high rotation rates of conventional drives, failure of the slider to maintain spacing can result in a catastrophic head disk interaction (HDI) or "head crash". While an HDI was once thought of as an instantaneous event, currently, it is recognized as a sequence of events. For example, the system may start off with the slider flying or in limited contact. If the slider then picks up some debris, the debris will either drag over the disk or alter the air bearing such that the slider flies lower. Debris may continue to collect on the slider as it flies at lower and lower spacings. Eventually, the slider begins to contact the disk initially breaking down the liquid or solid lubricant, wearing through the carbon overcoat and damaging the magnetic medium. This will roughen the disk surface making even partial flying over the affected tracks improbable. This is the HDI condition by which data can not be read or the servo-system fails.

Failure of a head disk assembly (HDA) from a head disk interaction frequently involves a loss of data. In some cases, the data can not be recovered. Thus, there has been a need in the art for systems and methods for predicting impending head crashes in disk drives.

In accordance with the present teachings, the frictional force between the head and the disk are sensed to predict a failure of the system due to an HDI.

Figure 2:
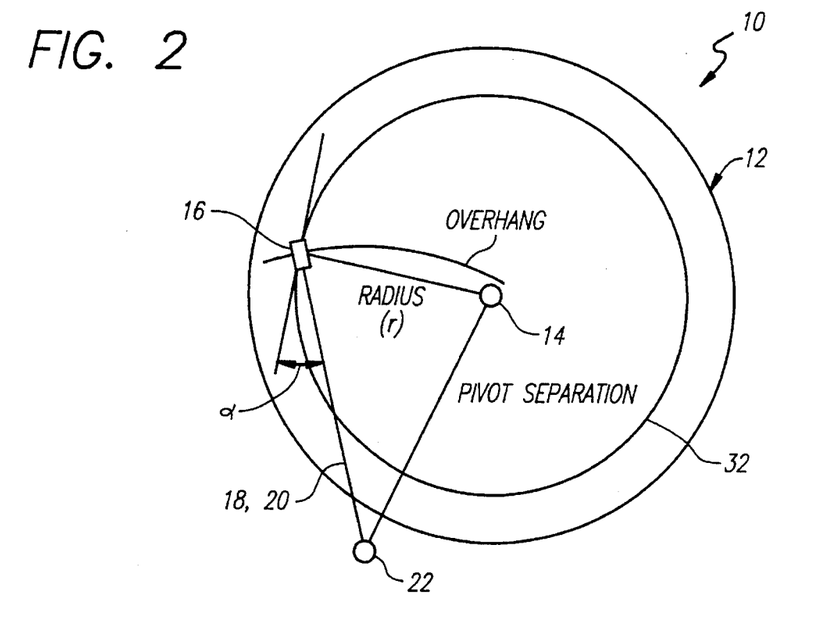
FIG. 2 is a diagram representing a simplified top view of the head disk assembly of FIG. 1.

FIG. 2 is a diagram representing a simplified top view of the head disk assembly of FIG. 1. The head 16 is positioned over a track 32 in the magnetic medium on the disk 12 at the end of the arm 20 and suspension 18. The lateral force at the head is composed of two forces. The first is the set of shear forces within the head disk interface (aerodynamic drag, hard body friction, etc.) which may generally be referred to as the "frictional force". The second force is due to air flow over the disk that acts on the sides of the head, the suspension 18 and the arm 20. This second force may be referred to as the "windage force". Depending on the layout of the system, these forces may not operate in the same direction. The frictional force between the spinning disk 12 and the head 16 will act along a line which is tangential to the track 32 at the head 16. In systems with rotary actuators, the angle between this tangent and the line joining the head and the actuator pivot 22 is the skew angle $\alpha$.

Figure 3:
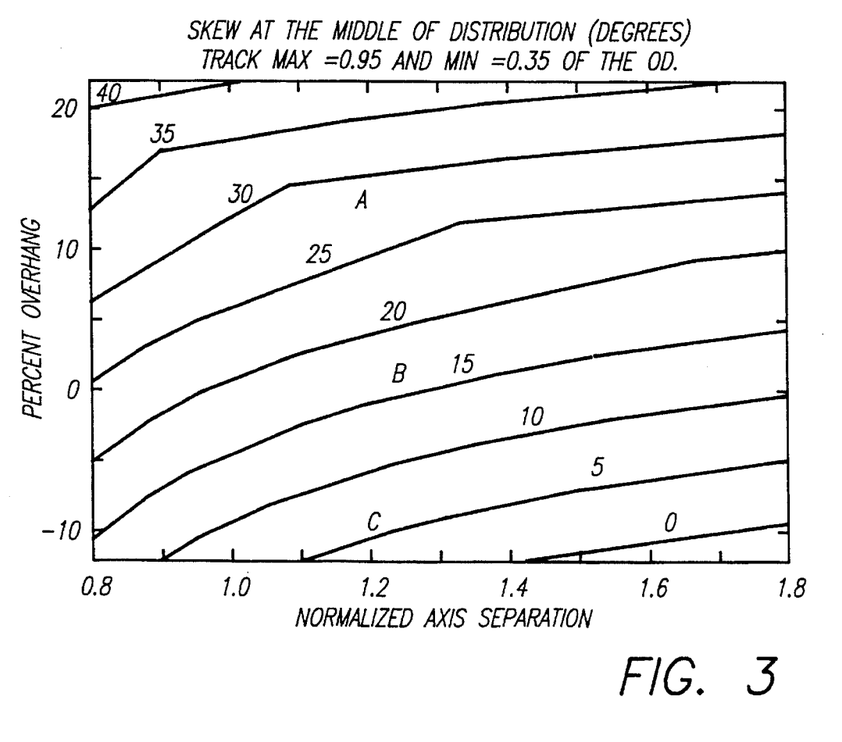
FIG. 3 shows the average skew angle for many head disk assembly designs.

FIG. 3 shows the average skew angle for many head disk assembly designs. FIG. 3 is normalized to a disk radius of one and uses the spindle to actuator pivot separation on the abscissa (expressed in disk radii) and the percent overhang on the ordinate (arm length minus separation divided by separation expressed as percent). Similar plots can be calculated for each specific maximum and minimum track radii of the disk. In FIG. 3, the point marked "A" is a design point that has a minimum skew angle range. The point "B" is near the designs of many current head disk assemblies known in the art. The point marked "C" is a design that uses a short arm.

Figure 4:
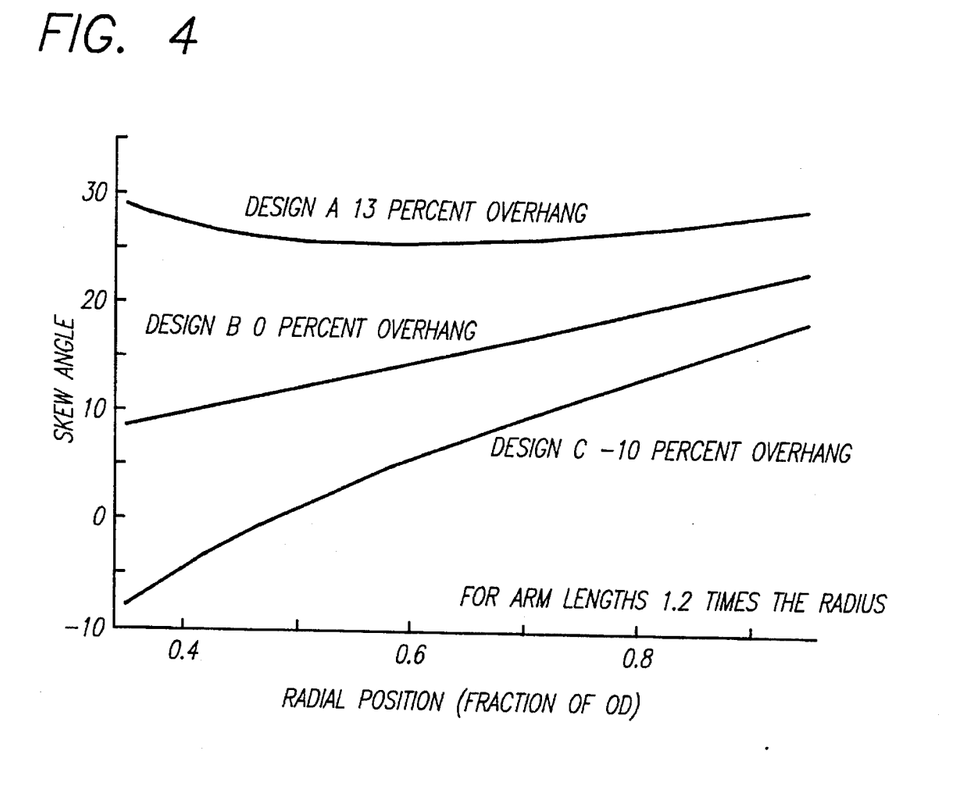
FIG. 4 shows skew angle distributions for three head disk assembly designs of FIG. 3 as a function of radial position.

FIG. 4 shows skew angle distributions for three head disk assembly designs of FIG. 3 as a function of radial position.

Figure 5:
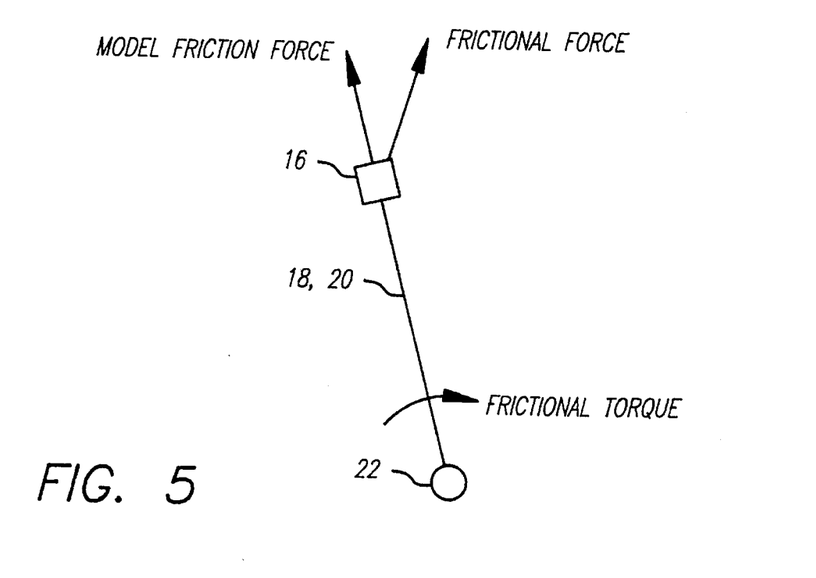
FIG. 5 is a simplified representation of the top view of a head disk assembly of FIG. 2 illustrating the components of the typical frictional force acting on the head thereof.

FIG. 5 is a simplified representation of the top view of a head disk assembly of FIG. 2 illustrating the components of the typical frictional force acting on the head thereof. The typical frictional force can be resolved into a force through the head and along the arm into the actuator bearing and an orthogonal force which can be converted to a torque about the pivot point as shown in FIG. 5. In accordance with conventional teachings, this force is held in equilibrium by the thrust strength of the actuator pivot bearings and torque supplied by the voice coil actuator motor 24.

Figure 6:
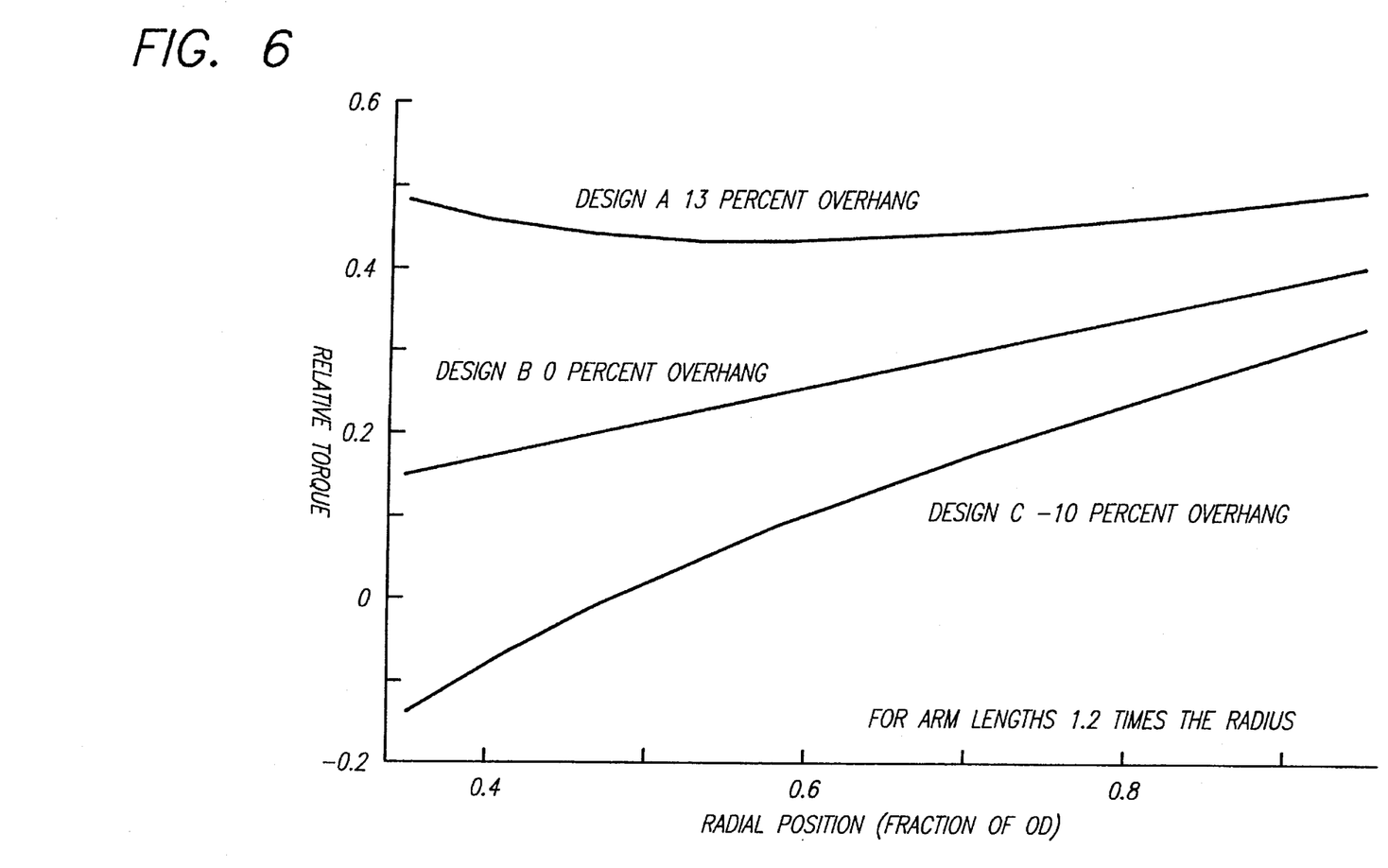
FIG. 6 shows the relative torque at the actuator due to the geometrical effects of skew as a function of the normalized radial position for the designs identified in FIG. 3.

FIG. 6 shows the relative torque at the actuator due to the geometrical effects of skew as a function of the normalized radial position for the designs identified in FIG. 3. The calculations assume a constant friction force at the suspension for all radial positions and an arm length of unity. Note that the design marked A (which is on the locus of the contour line inflections) has the most constant torque and the smallest skew distribution. The design marked B is linear and has less torque at the inside diameter. This is the closest to a nominal current design. The design marked C has torque in both directions and a range of near zero torque. Obviously, at zero skew, this design transmits no friction torque to the actuator.

Figure 7:
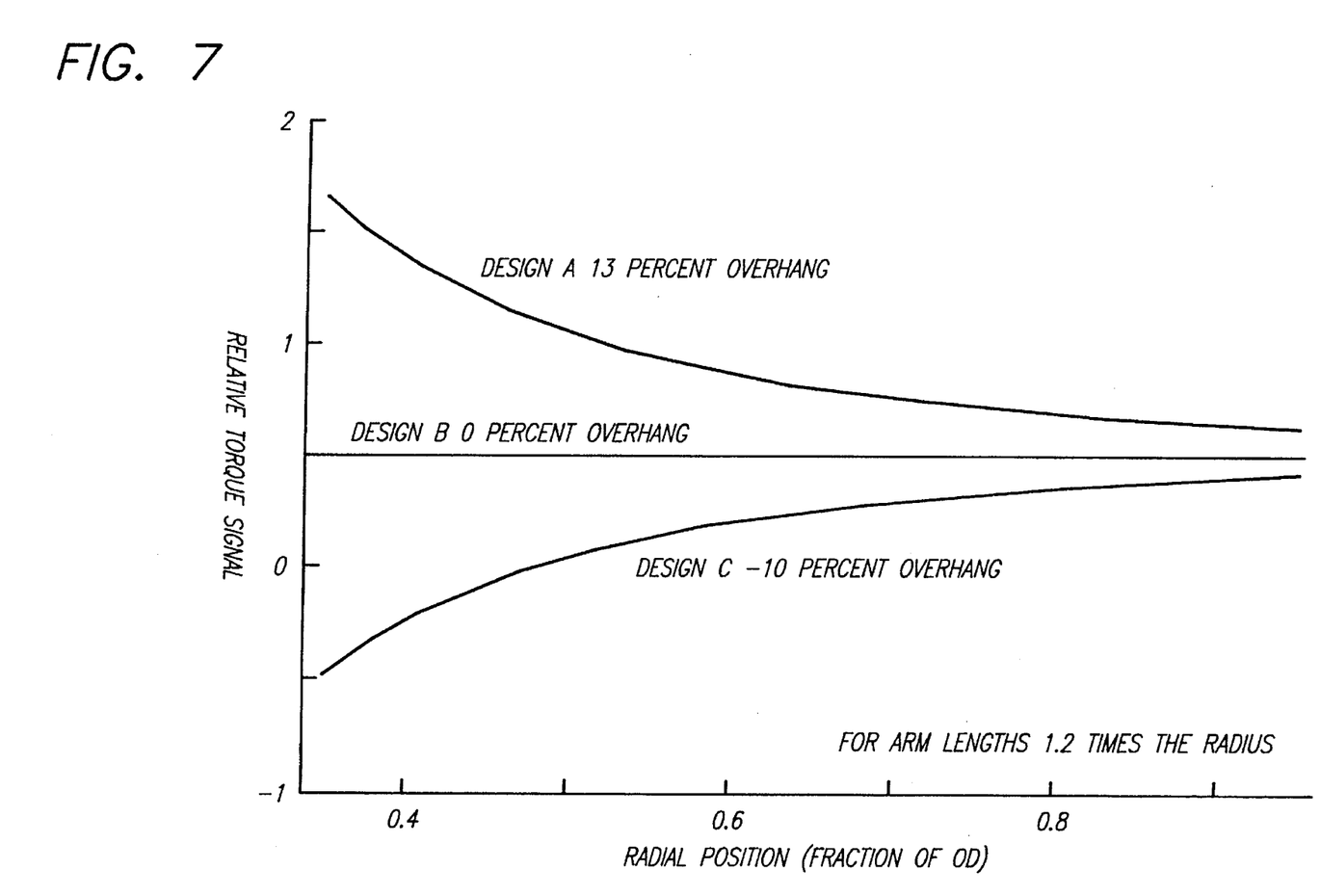
FIG. 7 shows the ratio of torque signals in the actuator motor relative to that in the spindle motor due to the same friction at the head.

FIG. 7 shows the ratio of torque in the actuator motor relative to that in the spindle motor due to the same friction at the head for the three exemplary designs. The design with zero overhang has a constant ratio between the actuator and spindle; this flatness and magnitude are independent of spindle separation.

The current which drives the voice coil must be actively supplied by the servo-control system of the storage unit. In accordance with the present teachings, the torque component of the normally small friction force and a larger windage force is measured and recorded for each track and then used as look-forward data in the servo-system. As the flying height of the head drops to zero and the head begins to erode the lubricant on the disk, the frictional force on the head increases. This results in an increase in the torque component of the frictional force at the head and a slowing of the spindle motor.

In a healthy head disk assembly, the windage at any given track on any given disk should be a constant (that is, it should have a mean with a small standard deviation) and friction forces in the assembly should be small. The windage, as measured at the actuator, is the sum of all the windages in the cylinder. As discussed below, by assuming that the windage is constant, changes in the total torque on the motor can be attributed to changes in the frictional force and used to predict failure of the drive. Thus, as the head disk assembly approaches a head disk interaction, the servo-system will have to increase the current to the actuator motor to maintain the head at a particular track over the disk as compared to historical data for that track. Further, a range of cylinders may be expected to have torque measurements that are significantly higher than measurements made on adjacent cylinder ranges. A change in either of these measurements indicates interaction at the head disk interface.

In accordance with the present teachings, the change in friction between the head and the disk is determined by measuring the torque at the actuator motor or a change in speed of the spindle motor. These measurements are compared to historical data taken when the drive is healthy to predict a head crash.

Figure 8:
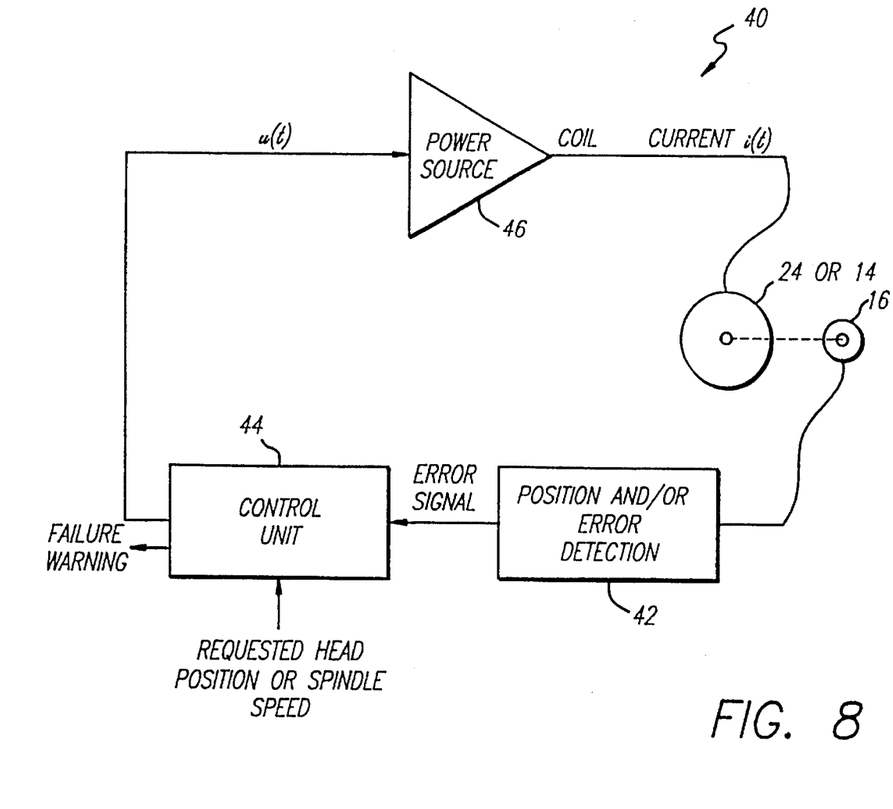
FIG. 8 is a block diagram of a head positioning servo-control system for the head disk assembly of FIG. 1 incorporating the teachings of the present invention.

FIG. 8 is a block diagram of a head positioning and spindle speed servo-control system for the head disk assembly of FIG. 1 incorporating the teachings of the present invention. The servo-control system 40 includes the transducer head 16 which provides an input to a conventional position and/or speed error detector 42. The error detector 42 provides an error signal to a control unit 44. In accordance with conventional teachings, the control unit 44 provides an output signal u(t) which is amplified and input as a drive current to the positioning motor(s) of the system 10. The control unit 44 typically includes a microprocessor which is programmed to provide position control drive signals for the motor to position the head 16 at a requested head position or to control spindle motor speed. In accordance with the present teachings, the system is further programmed to provide an output which warns of impending failure of the system 10.

Figure 9:
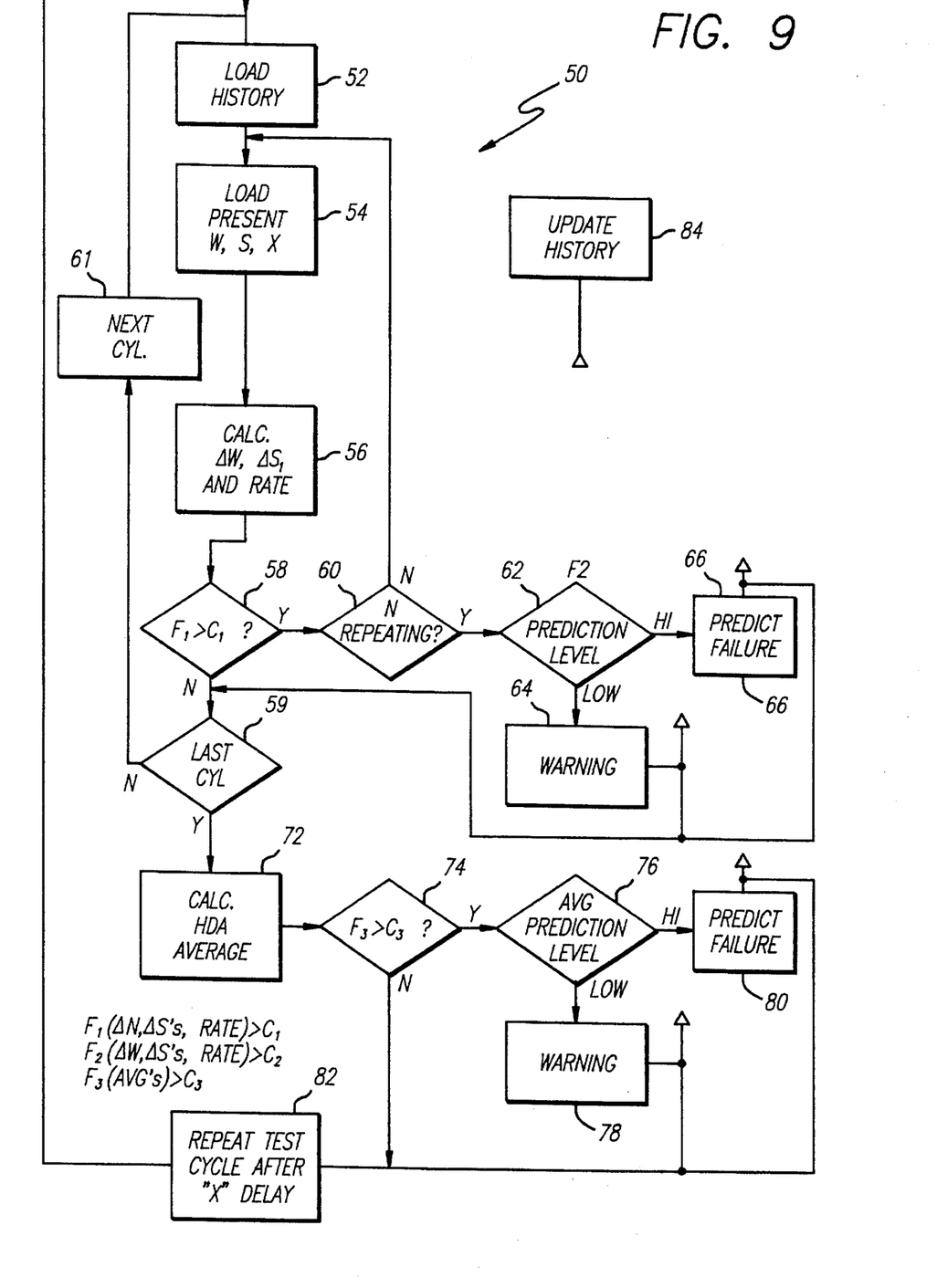
FIG. 9 is a flow diagram illustrating the operation of the method for predicting failure of the head disk assembly of FIG. 1 utilizing windage or spindle speed measurements in accordance with the teachings of the present invention.

FIG. 9 is a flow diagram illustrating the operation of the method for predicting failure of the head disk assembly of FIG. 1 utilizing windage or spindle speed measurements in accordance with the teachings of the present invention. The inventive method starts at step 52 by loading historical data representative of the torque (denoted generally as windage "W") for each track. Next, at step 54, the windage for the present track (and/or current to maintain disk speed) and/or the spectra "S" are loaded. At step 56, changes in friction sensed by detecting these variables are calculated and the rate of change thereof may be calculated. (Note that the actual frictional forces need not be determined.) This yields a first function $F_1$ which, at step 58, is compared to a first threshold $C_1$. If the threshold is not exceeded, the system moves to the next track, sector or cylinder at 59 and 61. If, however, the first function exceeds the first threshold, at step 60, the system performs a failsafe check to determine if the threshold is exceeded over a number of N consecutive repetitions. If not, it continues normal operation. If so, at step 62, the system checks the first function against a second threshold $C_2$ to determine what level of warning should be issued. If the second threshold is not exceeded, a low level warning is issued at step 64. If, however, the second threshold is exceeded, the system issues a high level warning by which failure is predicted. When the last cylinder is checked, average values are calculated as a third function $F_3$ at step 72. At step 74, this third function is compared to a third threshold $C_3$. If the third threshold is not exceeded, the system returns to the start position and is ready for the next sample to be taken after a delay 'X' at step 82.

If the third threshold is exceeded, the system issues either a low level warning at 78 or predicts failure at 80. Note that the up arrows after steps 62, 64, 66, 78 and 80 indicate that a step 84 is executed by which the variables are updated. In the preferred embodiment, this process may be interrupted by host system demands.

Returning to FIG. 8, whether the actuator motor 24 or the spindle motor 14 is driven depends on whether the invention is implemented as a first embodiment using the actuator motor or a second embodiment using the spindle motor or a combination thereof.

Figure 10:
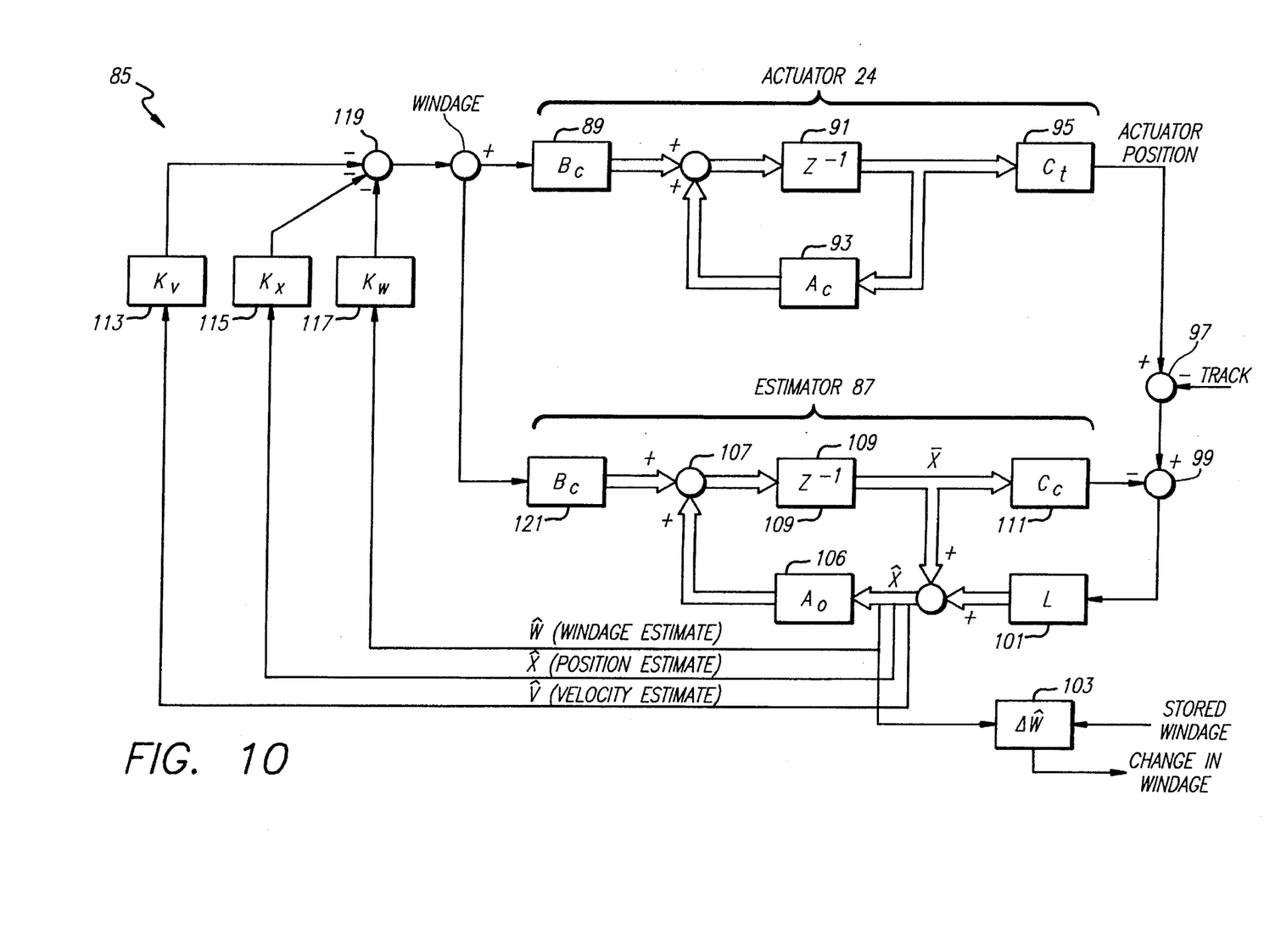
FIG. 10 is a functional block diagram of a method for calculating windage in accordance with the present teachings.

If the actuator motor is used, windage is calculated in the following manner. FIG. 10 is a functional block diagram of a method for calculating windage in accordance with the present teachings. The actuator 24, perturbed by windage torques, can be modeled by a set of mathematical equations embodied in the block labeled "ACTUATOR".

$$x_a(k+1) = A_c x_a(k) + B_c(u(k) + w(k)) \quad [1]$$

$$\text{head}(k) = C_c x_a(k) \quad [2]$$

where $x_a(k+1)$ are the states of the actuator which include velocity and position. The index "k" denotes the time at the k-th sector sample and u(k) and w(k) are the input torques to the actuator. That is, u(k) is the servo-calculated input and w(k) is the windage torque at time k.

The estimator 87 is a simplified algorithm to calculate the velocity, position and windage of the actuator based on the following simplified model of the actuator 24.

$$\begin{bmatrix} x(k+1) \\ w(k+1) \end{bmatrix} = \begin{bmatrix} A_c & B_c C_w \\ 0 & A_w \end{bmatrix} \begin{bmatrix} x(k) \\ w(k) \end{bmatrix} + \begin{bmatrix} B_c \\ 0 \end{bmatrix} u(k) \quad [3]$$

This algorithm ensures that the estimates of the actuator's windage are the same as the windage acting on the actuator. Any changes in windage including head-disk contact or low flying height is reflected in changes in the windage estimate, w(k), at time "k". In FIG. 10 when the output of the adder 99 goes to zero indicating that the estimator 87 is tracking the actuator 24 accurately, a change in windage estimate from the initial factory measured windage ΔW represents the windage due to the head-disk contact or low flying height.

Thus, for predictive failure analysis, the following steps are followed. First, start up windage is measured at the factory for several radial zones. Next, in each zone, the windage is averaged over several adjacent tracks to reduce the track to track variations in same. When taking measurements, it is necessary to take the measurements with the actuator moving in the same direction to eliminate pivot bearing hysteresis effects, i.e., the windage measurements for inward and outward measurements are different due to this effect and has to be taken into account. These zone windage measurements are stored in nonvolatile memory for use in the method identified above.

In the event that the spindle motor is used, the following method is employed. The speed of the disk is determined by the detection by the head 16 of pulses written on the disk 12 at uniform intervals on selected tracks for the purpose of data location and track identification. These magnetic pulses on each track, conventionally used for speed detection, are used for the detection of intermittent contact between head and disk. The pulses, called servo-identification timing marks are normally expected to occur at uniform intervals of time. If head-to-disk contact occurs, however, the time between the timing marks increases. This is due to an intermittent slowing of the disk caused by the torque produced by the increased frictional force during contact.

Figure 11:
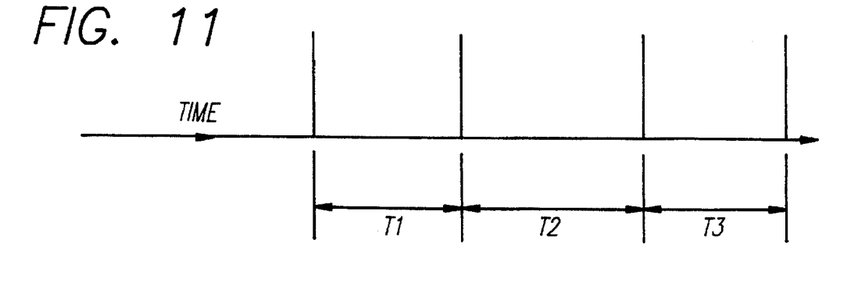
FIG. 11 shows servo-identification timing intervals for the servo-control system utilized in the present invention.

This is illustrated in FIG. 11 which shows servo-identification (SID) timing intervals. The contact causes a temporary slowing of the disk as shown by the second interval T2. That is, the second interval T2 is greater than either of the adjacent intervals T1 or T3, which represent nominal timing intervals, due to a slowing of the disk. The interval T3 is normal because the motor control 44 has recognized the slowing of the disk and has increased the motor torque accordingly.

Head disk contact is assumed based on the intermittent slowing of the disk. Knowledge of the air bearing surface geometry can be used to ensure that the disk slowing is caused by a head-to-disk contact. A typical air bearing layout is shown in FIG. 12.

Figure 12:
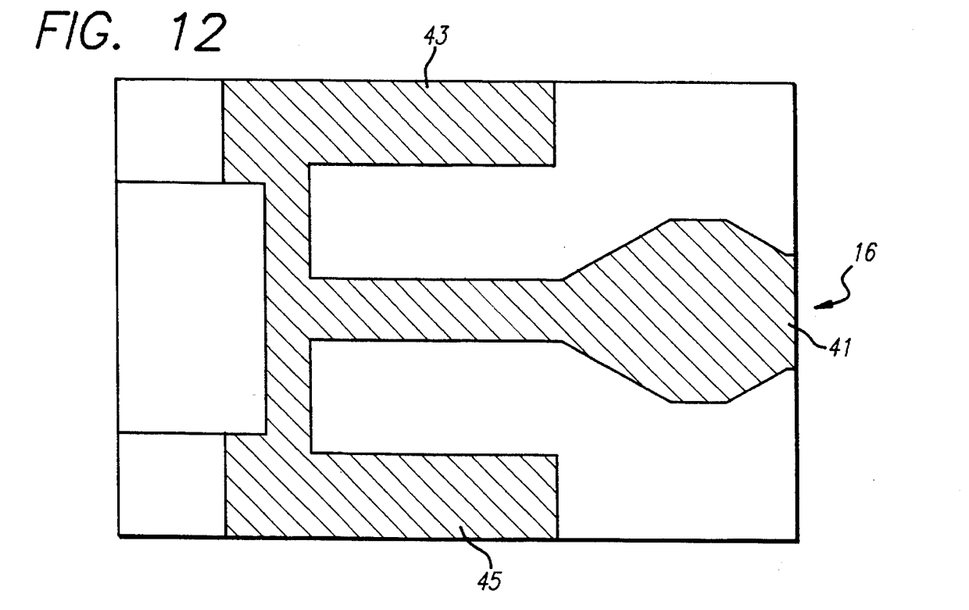
FIG. 12 shows a bottom view of the head to depict a typical air bearing geometry.

FIG. 12 shows a bottom view of the head to depict a typical air bearing geometry. Three rails are shown, an inner rail 41 and two outer rails 43 and 45. As the head accesses track-by-track over a defect, contact should only take place on these rails. Between the rails, the surface of the head is very far removed from the disk surface. Knowledge of the air bearing rails, in relationship to each other, allows for the determination of the location at which the contact should occur.

Figure 13:
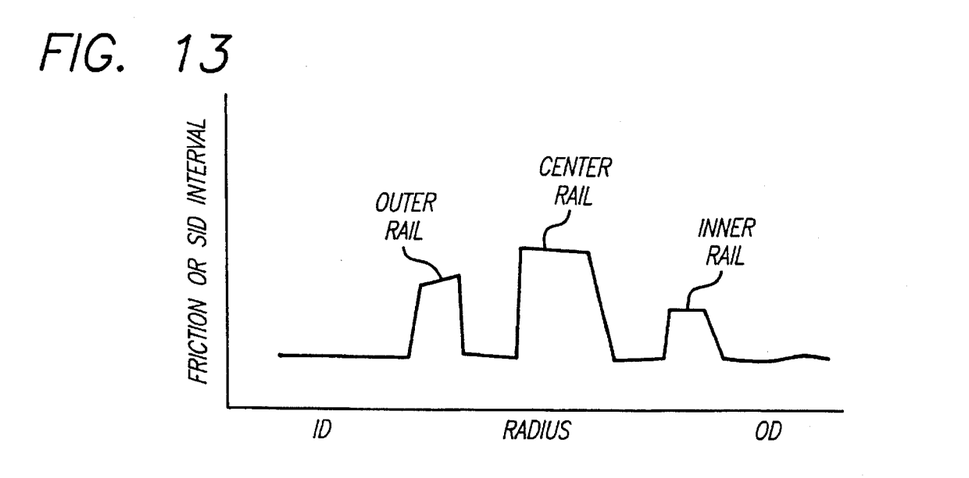
FIG. 13 is a diagram of friction or SID interval as a function of radius.

FIG. 13 is a diagram of friction or SID interval as a function of the radius of the disk 12. FIG. 13 shows that contact which produces friction and thus slows the disk will occur only at the rail locations. The friction is highest for the center rail because this rail typically flies at a lower altitude than the other two rails. The lower altitude means more interference with the disk, hence, increased friction force. This provides a slider "fingerprint" that can be used when using servo errors to determine if a disk asperity is present.

Figure 14:
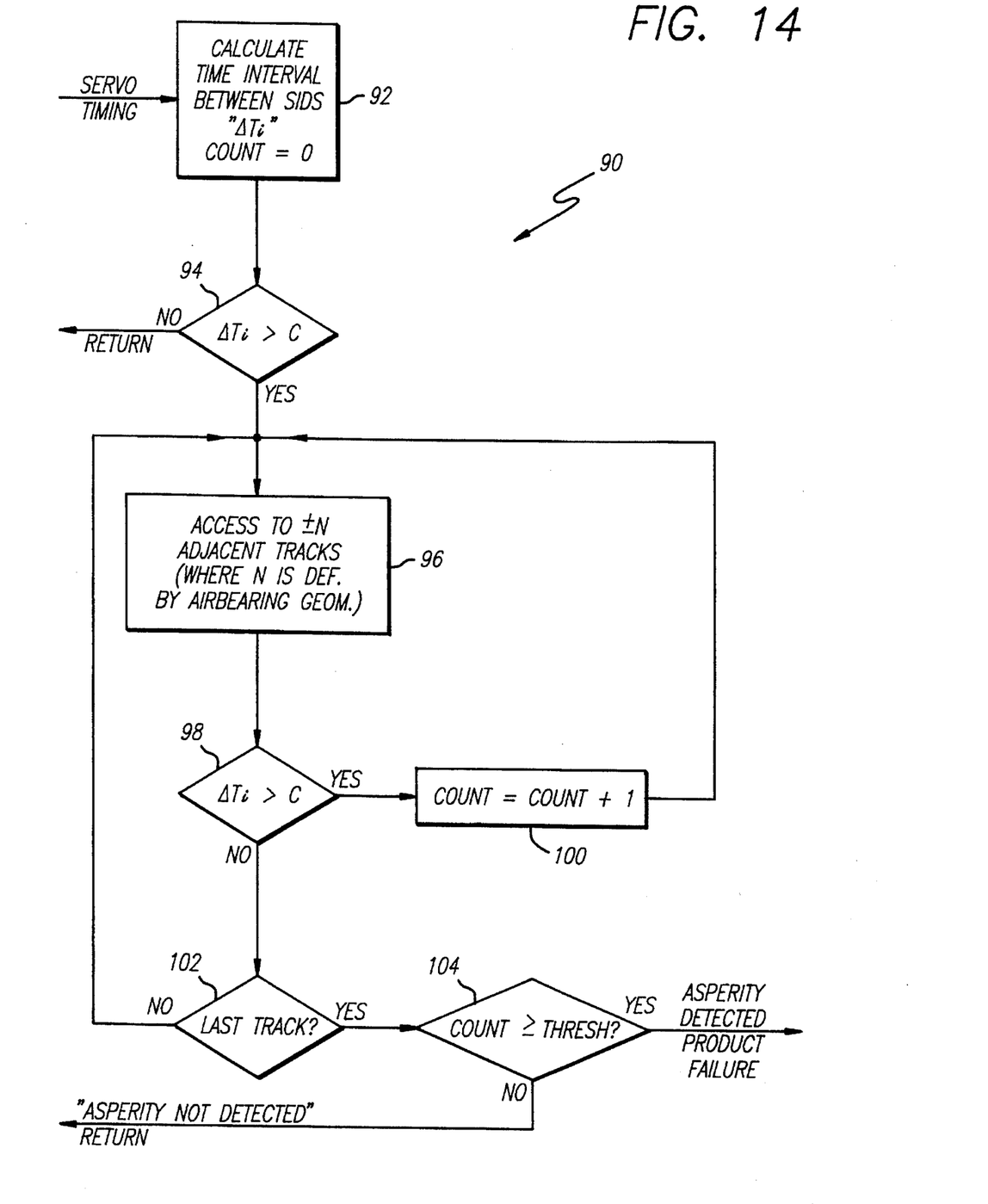
FIG. 14 is a flow diagram illustrating the operation of the method for predicting failure based on intermittent head-to-disk contact in accordance with the teachings of the present invention.

FIG. 14 is a flow diagram 90 illustrating the operation of the method for predicting failure based on intermittent head-to-disk contact in accordance with the teachings of the present invention. At the first step 92, the time interval between servo-identification timing marks (SIDS) is monitored by the controller 44. If, at step 94, the SID interval increases beyond a time "C" (the maximum SID interval allowed), at steps 96 and 98±N adjacent tracks are checked to determine if the threshold remains exceeded. At step 100, each time the threshold "C" is exceeded, a variable "COUNT" is incremented by one. After a prescribed number of tracks have been checked at step 102, the count variable is compared to a threshold "THRESH" at step 104. If COUNT is still greater than or equal to THRESH, an error is reported indicating that the drive is likely to fail. If the SID interval for the ith SID (called $\Delta T_i$) is not greater than C for the required THRESH, the drive is not failed and normal operation resumes.

The choice between sensing the friction at the actuator or the spindle motors may be made on the basis of the signal-to-noise and the gain bandwidth of the two servo-systems.

The present invention has been described herein with reference to a particular embodiment for a particular application. Those having ordinary skill in the art and access to the present teachings will recognize additional modifications applications and embodiments within the scope thereof. For example, the invention is not limited to use with storage units, nor to a particular type of storage unit. The invention may be used in other applications where an element is suspended over a surface moving relative thereto. In addition, the invention is not limited to the method illustrated for generating a warning. Other techniques may be used without departing from the scope of the invention.

It is therefore intended by the appended claims to cover any and all such applications, modifications and embodiments within the scope of the present invention.

Accordingly,

What is claimed is:

1. A system for predicting failure of a storage system including:

first means for moving an element over a surface, said surface moving relative to said element and said first means including an arm for supporting said element over said surface and a motor connected to said arm;

second means for detecting a change in a lateral force applied to said element and for providing a signal in response thereto, wherein said lateral force comprises a frictional force and a windage force, said second means including means for calculating said windage force; and third means for processing said signal and predicting a failure of the storage system in response thereto.

2. The invention of claim 1 wherein said storage system further includes means for recording a torque component of said frictional force and said windage force.

3. The invention of claim 2 wherein said first means is a rotary actuator.

4. The invention of claim 3 wherein said storage system is a disk drive.

5. The invention of claim 4 wherein said surface is a disk.

6. The invention of claim 5 wherein said element is a transducer head.

7. The invention of claim 6 wherein said motor is an actuator motor.

8. The invention of claim 7 wherein said second means includes means for sensing a change in position of said element over said surface in response to the application of a steady state signal to said actuator motor.

9. A system for predicting failure of a storage system based on intermittent contact between an element and a surface, said system including:

first means for supporting said element over said surface;

second means for moving said surface relative to said element, said second means including a motor;

third means for detecting a change in a lateral force applied to said element during said intermittent contact between said element and said surface, wherein said lateral force comprises a frictional force and a windage force, said third means including means for detecting a change in speed of said surface during said intermittent contact of said element therewith, means for calculating said windage force, and means for providing a signal in response thereto, and fourth means for processing said signal and predicting a failure of the storage unit in response thereto.

10. The invention of claim 9 wherein said system further includes means for recording a torque component of said frictional force and said windage force.

11. The invention of claim 10 wherein said second means is a rotary actuator.

12. The invention of claim 11 wherein said storage system is a disk drive.

13. The invention of claim 12 wherein said surface is a disk.

14. The invention of claim 13 wherein said element is a transducer head.

15. The invention of claim 14 wherein said motor is a spindle motor.

16. A method for predicting failure of a system having a surface and an element supported over said surface, said surface being rotated relative to said element by a first motor, said method including the steps of:

storing a torque component of a frictional force and a windage force that is applied to said element under a first state of operation of said system;

measuring a torque component of a frictional force and a windage force that is applied to said element under a second state of operation of said system; and comparing the measured indication of the torque component and the windage force to the stored value to provide an indication of the state of operation of said system.

* * * * *